US012584938B2

(12) United States Patent
Ballhagen

(10) Patent No.: US 12,584,938 B2
(45) Date of Patent: Mar. 24, 2026

(54) MOTION-ACTIVATED SOUND PLAYER

(71) Applicant: Chad Ballhagen, Wilmot, SD (US)

(72) Inventor: Chad Ballhagen, Wilmot, SD (US)

( * ) Notice: Subject to any disclaimer, the term of this patent is extended or adjusted under 35 U.S.C. 154(b) by 215 days.

(21) Appl. No.: 18/585,950

(22) Filed: Feb. 23, 2024

(65) Prior Publication Data

US 2025/0271460 A1     Aug. 28, 2025

(51) Int. Cl.
| | |
|---|---|
| *G01P 13/00* | (2006.01) |
| *G01K 3/00* | (2006.01) |
| *G06F 3/16* | (2006.01) |
| *H04R 1/02* | (2006.01) |
| *H04R 3/00* | (2006.01) |
| *H05B 1/02* | (2006.01) |

(52) U.S. Cl.
CPC .............. *G01P 13/00* (2013.01); *G01K 3/005* (2013.01); *G06F 3/165* (2013.01); *H04R 1/028* (2013.01); *H04R 3/00* (2013.01); *H05B 1/0202* (2013.01)

(58) Field of Classification Search
None
See application file for complete search history.

(56) References Cited

U.S. PATENT DOCUMENTS

| | | | | |
|---|---|---|---|---|
| 10,881,096 B1 * | 1/2021 | Sweeney | ............... | A01M 29/16 |
| 2014/0183326 A1 * | 7/2014 | Ples | ........................ | F16M 11/08 |
| | | | | 248/550 |
| 2016/0002948 A1 * | 1/2016 | Galarza | ................. | E04H 13/003 |
| | | | | 386/230 |
| 2017/0041584 A1 * | 2/2017 | Jones | ........................ | H04N 5/76 |
| 2022/0403675 A1 * | 12/2022 | Scaife | ................... | E04H 13/001 |

* cited by examiner

*Primary Examiner* — Thomas S Mccormack
(74) *Attorney, Agent, or Firm* — Merchant & Gould P.C.

(57) ABSTRACT

A motion-activated sound player is provided. In embodiments, the motion-activated sound player includes a motion sensor assembly and a temperature sensor. When the motion sensor assembly detects motion and the temperature sensor determines an operating temperature is within a predetermined operating temperature range, the motion-activated sound player plays one or more audio tracks. In further embodiments, the motion-activated sound player includes temperature elements, such as heating elements and heat sinks, to maintain the operating temperature within the predetermined operating temperature range. In an example, the motion-activated sound player is installed at an outdoor memorial structure, such as a stone monument (e.g., a gravestone).

20 Claims, 15 Drawing Sheets

600

Establish Connection
with Programming
Device
602

Disable Playback
604

Receive Programming
Instructions
606

Modify Memory
608

Terminate Connection
with Programming
Device
610

Enable Playback
612

MOTION-ACTIVATED SOUND PLAYER

BACKGROUND

Audio players are used to project sound in many environments. While often used indoors, audio players may also be installed for use in outdoor, uncovered environments. However, use of audio players in outdoor environments has limitations. For example, audio players in outdoor environments may experience increased wear due to uncontrolled weather conditions. Batteries or other electrical components in the audio player may operate outside of an acceptable operating temperature range due to overly high or overly low outdoor temperatures, damaging the batteries or other electrical components. Audio players face further challenges in outdoor environments when installed in an uncovered setting. In uncovered, outdoor environments, audio players face moisture in the form of rain and snow that can leak into the audio players and damage electrical components.

SUMMARY

In general terms, this disclosure is directed to a motion-activated sound player. In some embodiments, and by non-limiting example, the motion-activated sound player plays audio when a visitor is detected proximate to the motion-activated sound player and an operating temperature is determined to be within a predetermined operating temperature range.

In a first aspect, a motion-activated sound player embeddable within a cavity of an outdoor memorial structure is provided. The motion-activated sound player includes a power source, a speaker, a motion sensor assembly, and a controller. The power source supplies power to the motion-activated sound player. The controller includes a temperature sensor and a memory device that stores one or more audio tracks. In response to the controller determining that a visitor is proximate to the motion-activated sound player based on signals from the motion sensor assembly and the temperature sensor determining that an operating temperature is within a predetermined operating temperature range, the controller sends a signal to the speaker to play at least a portion of a selected audio track of the stored one or more audio tracks.

In a second aspect, a motion-activated sound player is provided. The motion-activated sound player comprises a capsule, a motion sensor assembly, and a solar panel assembly. The capsule includes a cavity divider, a face plate, and an end cap. The cavity divider defines a first cavity and a second cavity in the capsule. The first cavity houses a speaker, and the second cavity houses a controller and a battery. The controller includes a memory device that stores one or more audio tracks and a temperature sensor. The battery supplies power to the motion-activated sound player. The face plate is attachable to a front face of the capsule to enclose the first cavity, and the end cap is attachable to the capsule to enclose the second cavity. The solar panel assembly converts sunlight to electricity to selectively recharge the battery. In response to the motion sensor assembly detecting motion and the temperature sensor determining that an operating temperature is within a predetermined operating temperature range, the controller sends a signal to the speaker to play at least a portion of a selected audio track of the stored one or more audio tracks.

In a third aspect, an audio-enabled stone monument is provided. The audio-enabled stone monument comprises a stone monument and a motion-activated sound player. The motion-activated sound player includes a capsule installed in a bore on a side face of the stone monument, a motion sensor assembly installed on a front face of the stone monument, and a solar panel assembly installed on a top face of the stone monument. The capsule includes a cavity divider defining a first cavity and a second cavity in the capsule. The first cavity houses a speaker, and the second cavity houses a controller and a battery. The controller includes a memory device that stores one or more audio tracks and a temperature sensor. The battery supplies power to the motion-activated sound player. The solar panel assembly converts sunlight to electricity to selectively recharge the battery. In response to the controller determining that a visitor is proximate to the stone monument based on signals from the motion sensor assembly and the temperature sensor determining that an operating temperature is within a predetermined operating temperature range, the controller sends a signal to the speaker to play at least a portion of a selected audio track of the stored one or more audio tracks.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
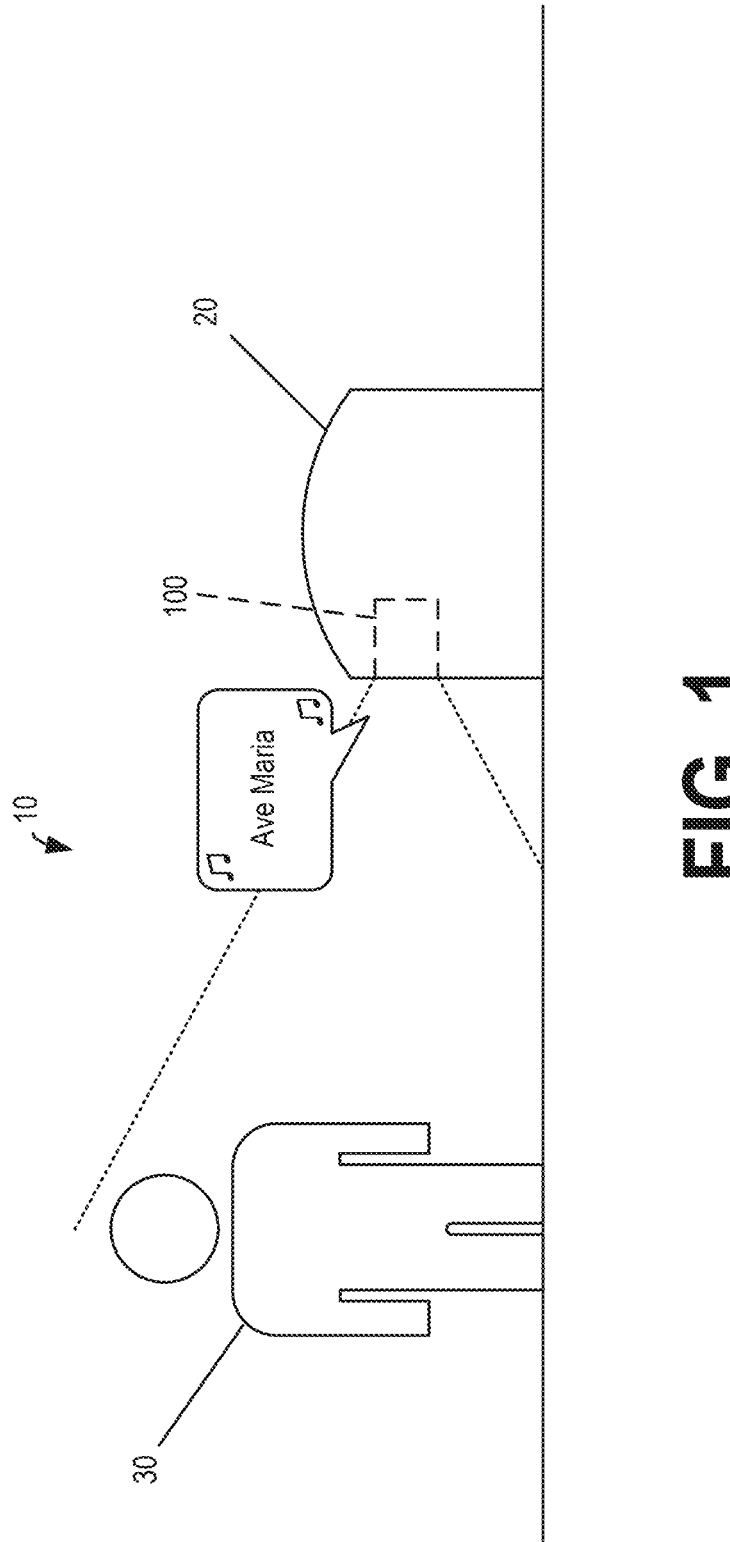
FIG. 1 illustrates an example environment in which aspects of the present disclosure may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As used herein, the term "including" as used herein should be read to mean "including, without limitation," "including but not limited to," or the like. The term "substantially" as used herein is a broad term and is to be given its ordinary and customary meaning to a person of ordinary skill in the art (and is not to be limited to a special or customized meaning), and furthermore refers without limitation to being largely but not necessarily wholly that which is specified.

As briefly described above, embodiments, of the present disclosure are directed to a motion-activated sound player. In example aspects, the motion-activated sound player includes a motion sensor assembly, a speaker, and a controller. When the motion sensor assembly detects motion, the controller sends signals to the speaker to play audio. In further aspects, the controller includes a temperature sensor. The temperature sensor monitors an operating temperature of the motion-activated sound player or specific components of the sound player. If the temperature sensor determines that the operating temperature is outside a predetermined operating temperature range, the controller prevents audio playback. By monitoring the operating temperature of the motion-activated sound player and its components to prevent operation outside of the predetermined operating temperature range, the sound player may experience less wear and operate for a longer lifespan.

In further aspects, the motion-activated sound player includes temperature elements to maintain the operating temperature within the predetermined operating range. For example, a heating coil selectively produces heat to increase the operating temperature to maintain the operating temperature above a lower limit of the predetermined operating range. In another example, a heat sink dissipates heat from electrical components of the motion-activated sound player to cool the electrical components and maintain the operating temperature below an upper limit of the predetermined operating range.

In further example aspects, the motion-activated sound player includes a capsule enclosing electrical components of the motion-activated sound player. The capsule protects the electrical components from moisture in an outdoor environment. In some examples, the capsule defines multiple cavities. By defining multiple cavities, some electrical components have additional layers of protection from external moisture.

In further example aspects, the motion-activated sound player is installed at an outdoor memorial structure. In examples, an outdoor memorial structure could include a stone monument, such as a gravestone. In such examples, the motion-activated sound player plays audio tracks when visitors visit the stone monument.

While examples disclosed herein describe the motion-activated sound player installed at a stone monument, aspects of this disclosure are not limited to such installations. The motion-activated sound player described herein can be installed in other environments while functioning in substantially the same manner. For example, the motion-activated sound player described herein may be installed in other outdoor environments—such as in a mailbox—or in indoor environments—such as in a doorway.

Turning now to FIG. 1, an example environment 10 in which aspects of the present disclosure may be implemented is shown. In the illustrated example, a motion-activated sound player 100 is installed in a stone monument 20. In the illustrated embodiment, the stone monument 20 is a gravestone. In alternative embodiments, the stone monument 20 is any type of outdoor memorial structure. When the motion-activated sound player 100 detects the presence of a visitor 30 proximate to the stone monument 20, the motion-activated sound player 100 activates to play an audio track.

Figure 2:
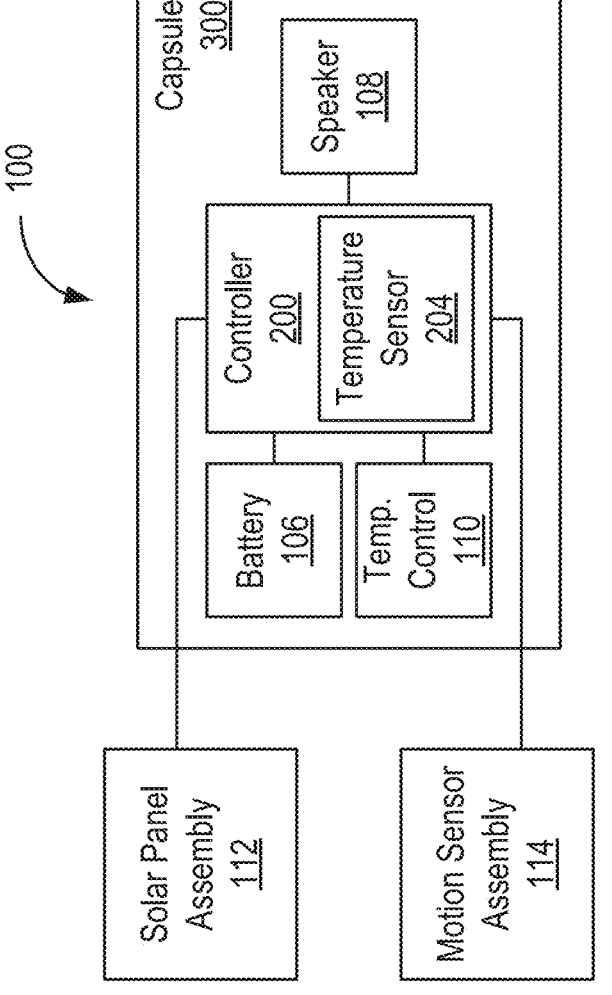
FIG. 2 illustrates a schematic block diagram of an example embodiment of a motion-activated sound player.

FIG. 2 illustrates a schematic block diagram of an example embodiment of the motion-activated sound player 100. In the illustrated embodiment, the motion-activated sound player 100 includes a controller 200, a battery 106, a speaker 108, temperature elements 110, a solar panel assembly 112, and a motion sensor assembly 114. The controller 200, the battery 106, the speaker 108, and the temperature elements 110 are enclosed within a capsule 300, and the solar panel assembly 112 and the motion sensor assembly 114 are external to the capsule 300. In embodiments, such as is shown in FIG. 1, the motion-activated sound player 100 is installed at a stone monument 20.

The controller 200 controls the motion-activated sound player 100. The controller 200 determines when the motion-activated sound player 100 plays audio tracks. In examples, the controller 200 uses the motion sensor assembly 114 to determine when a visitor is proximate to the motion-activated sound player 100. When a visitor is detected proximate to the motion-activated sound player 100, the controller 200 activates the speaker 108 to play an audio track. As described herein, the controller 200 includes a memory storing one or more audio tracks, and the controller 200 selects an audio track to play through the speaker 108 from the memory.

In further examples, the controller 200 includes a temperature sensor 204, and the controller 200 controls the motion-activated sound player 100 based on an operating temperature sensed by the temperature sensor 204. In embodiments, the temperature sensor 204 determines the operating temperature by measuring a temperature within the capsule 300. In alternative embodiments, the temperature sensor 204 determines the operating temperature by monitoring a temperature of one or more components within the motion-activated sound player 100. For example, the temperature sensor 204 monitors a temperature of the battery 106. In other examples, the temperature sensor 204 additionally or alternatively monitors the temperature of other components of the motion-activated sound player 100, such as the speaker 108 or the controller 200. The controller 200 compares the operating temperature sensed by the temperature sensor 204 to a predetermined operating temperature range, and if the operating temperature is outside of the predetermined operating temperature range, the controller 200 prevents the motion-activated sound player 100 from playing audio tracks, even if the motion sensor assembly 114 detects a visitor proximate to the motion-activated sound player 100. In alternative embodiments, the controller 200 additionally or alternatively prevents the battery 106 from charging or discharging when the operating temperature is outside of the predetermined operating temperature range. In an example, the predetermined operating temperature range is −20° C. to +50° C. As described herein, the predetermined operating temperature range is customizable in some embodiments.

The temperature elements 110 help maintain the operating temperature within the predetermined operating range.

Figure 5:
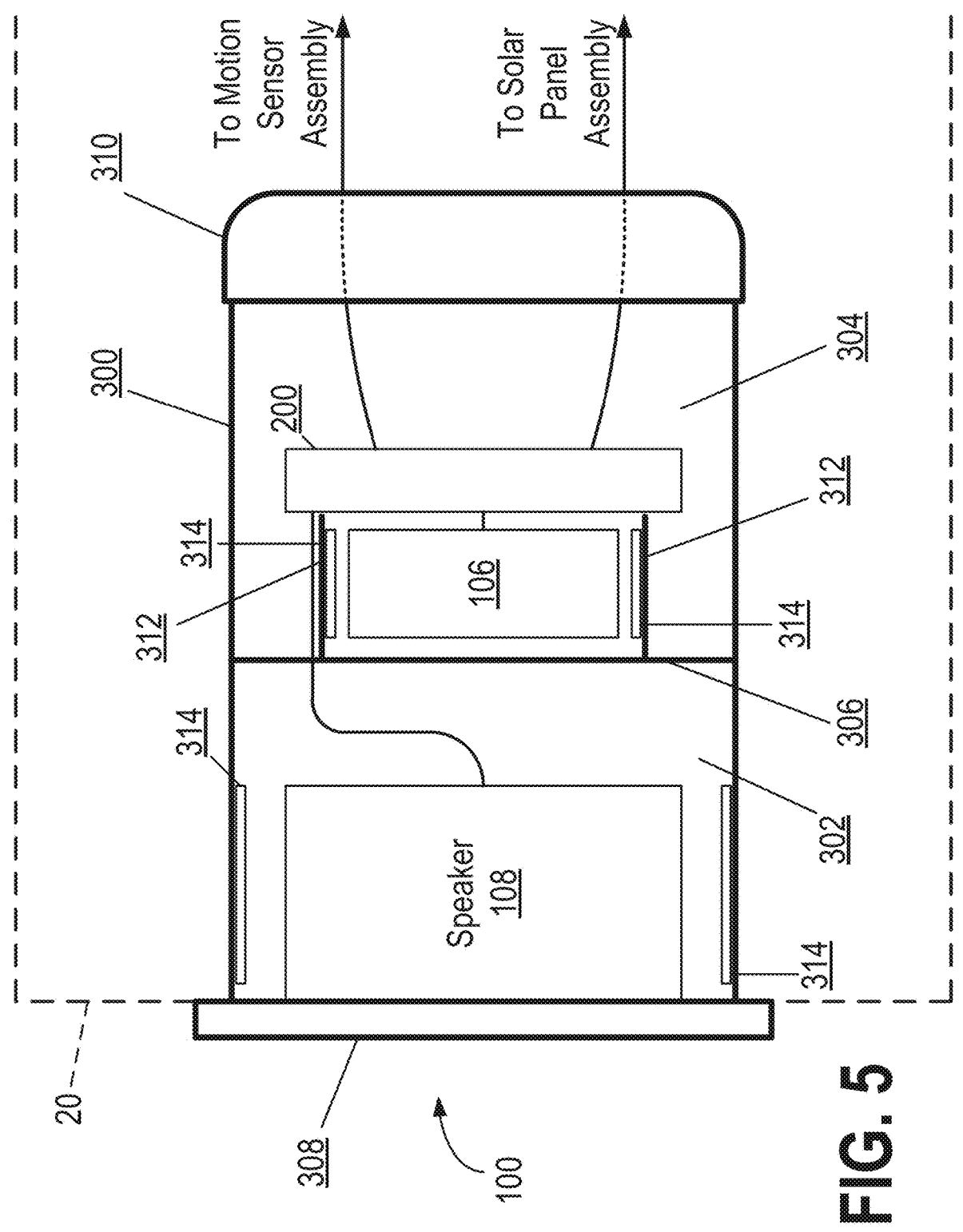
FIG. 5 illustrates a second example embodiment of a motion-activated sound player arranged within a capsule installed at a stone monument.
Figure 6:
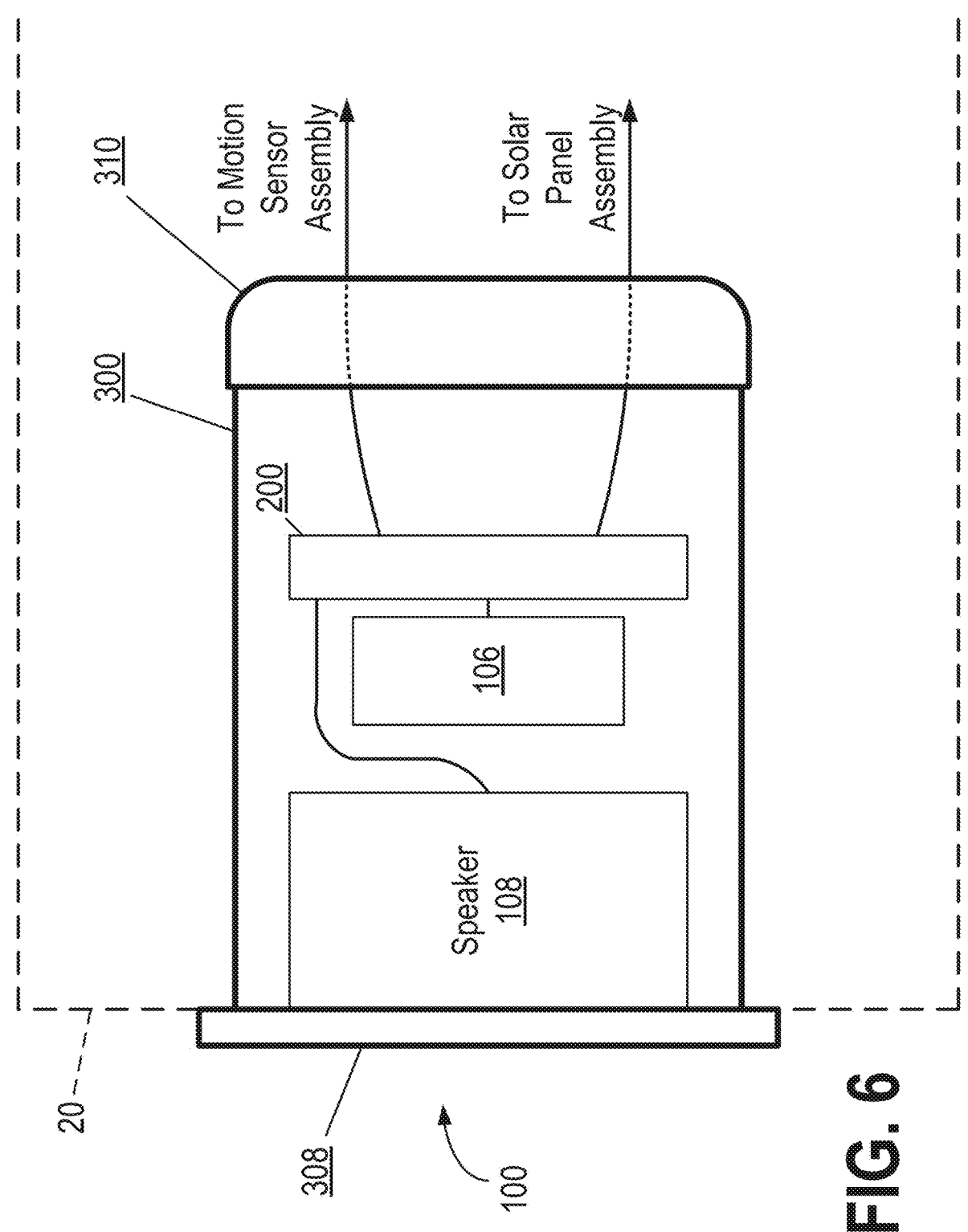
FIG. 6 illustrates a third example embodiment of a motion-activated sound player arranged within a capsule installed at a stone monument.
Figure 7:
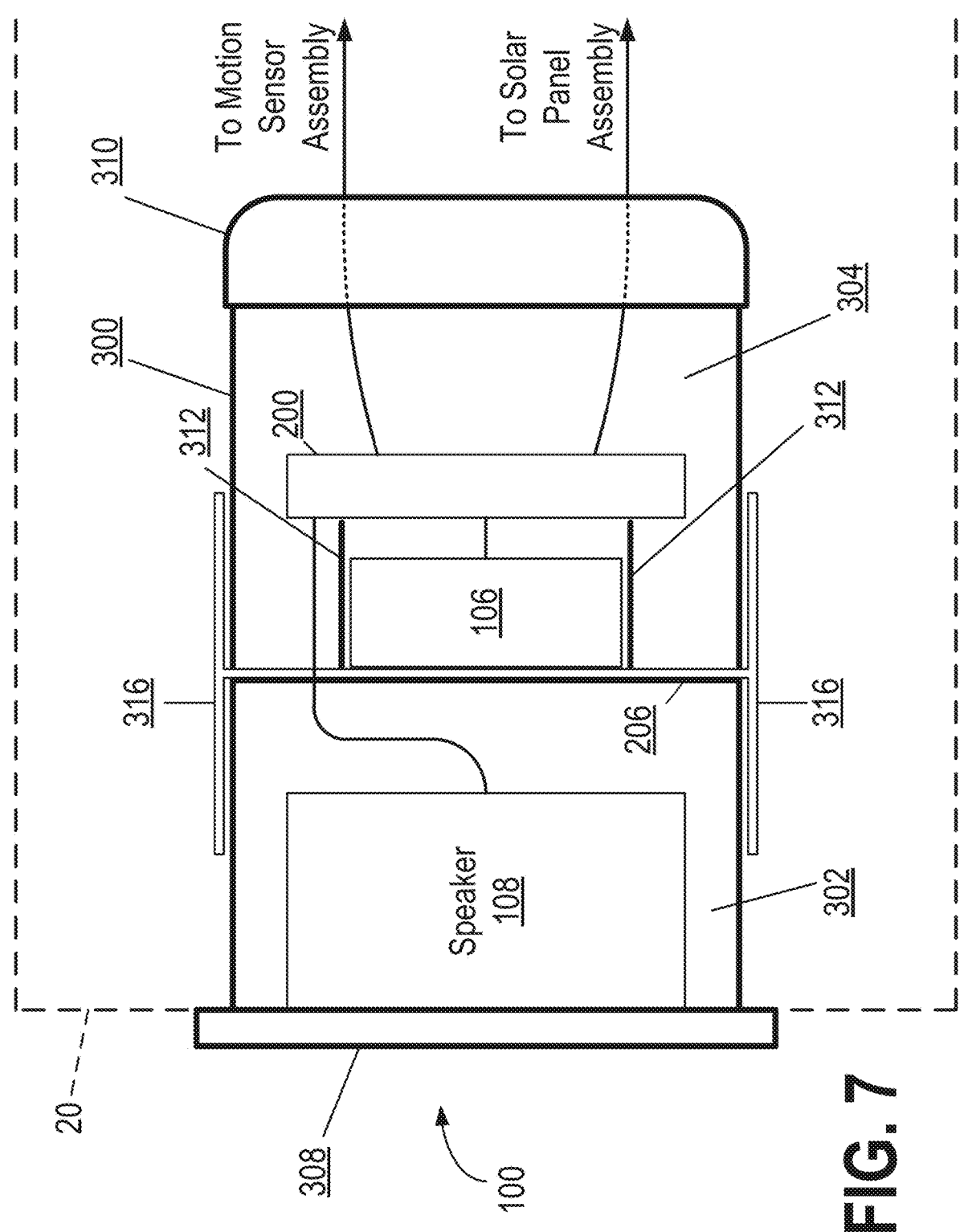
FIG. 7 illustrates a fourth example embodiment of a motion-activated sound player arranged within a capsule installed at a stone monument.

Examples of temperature elements 110 are described further herein, particularly with reference to FIGS. 5-7.

The speaker 108 plays audio for the motion-activated sound player 100. In embodiments, the speaker 108 is waterproof, substantially protecting the speaker 108 from water damage when the motion-activated sound player 100 is installed in an uncovered, outdoor environment. In an embodiment, the speaker 108 is an AQ-SPK 3.0UN-4 speaker manufactured by Aquatic AV with its principal place of business in San Jose, CA.

The battery 106 and the solar panel assembly 112 act as a power source for the motion-activated sound player 100. The battery 106 supplies power to the controller 200 and, in turn, the other electrical components of the motion-activated sound player 100 such as the speaker 108 and the motion sensor assembly 114. In an example embodiment, the battery 106 is a rechargeable Lithium-ion battery. The capacity of the battery 106 can be changed depending on the power consumption requirements of the other electrical components in the motion-activated sound player 100 and a desired minimum operating time of the motion-activated sound player 100. In an example, the motion-activated sound player 100 is configured to have a minimum operating time of 4 hours and the speaker 108 has an average energy consumption of 2 watt-hours, so to accommodate this energy consumption the battery 106 has a capacity greater than 8 watt-hours. The operating voltage of the battery 106 can also be changed based on voltage requirements of the other electrical components of the motion-activated sound player 100. In an example, the battery 106 has an operating voltage between approximately 3 volts and approximately 4.2 volts, with a nominal voltage of approximately 3.7 volts.

The solar panel assembly 112 recharges the battery 106. The solar panel assembly 112 converts sunlight into electricity to recharge the battery 106. In an embodiment, the controller 200 controls the charging of the battery 106, and the electricity output by the solar panel assembly 112 returns to the battery 106 through the controller 200. In alternative embodiments, the solar panel assembly 112 is directly connected with the battery 106. An output voltage of the solar panel assembly 112 can vary based on a number of cells in the solar panel assembly 112. In an example, each cell in the solar panel assembly outputs between approximately 0.4 volts and 0.6 volts. The number of cells in the solar panel assembly 112, an in turn the output voltage of the solar panel assembly 112, can be configured based on a voltage tolerance of the controller 200 and other electronic components of the motion-activated sound player 100. In an embodiment, the solar panel assembly 112 has an output voltage between approximately 6 volts and approximately 24 volts.

As previously described, the motion sensor assembly 114 senses for visitors proximate to the motion-activated sound player 100. In example embodiments, the motion sensor assembly 114 is a passive infrared sensor. In an example, the motion sensor assembly 114 is a EKMC1601112 passive infrared sensor manufactured by Panasonic Holdings Corporation with its principal place of business in Kadoma, Osaka, Japan. In an embodiment, the motion sensor assembly 114 has a rated detection range of approximately 4 meters and a rated detection angle range of approximately 90° (±45° from vertical). The detection range of the motion sensor assembly 114 can be modified for different operating conditions. For example, when installed at a gravestone, the detection range may be modified to be smaller to avoid detection of individuals that are not visiting the gravestone at which the motion-activated sound player 100 is installed.

In an embodiment, the motion sensor assembly 114 is programmed to detect motion out to 6 feet with an angle range of ±25°.

In an embodiment, the motion sensor assembly 114 is a passive infrared sensor that includes two slots, and each slot is sensitive to infrared radiation. In such an embodiment, the output from the motion sensor assembly 114 is a differential between the two slots. For example, when the motion sensor assembly 114 is idle—i.e., there is no movement-both slots detect the same amount of infrared radiation, and the output signal is approximately zero. When a body producing infrared radiation, such as a human, enters the range monitored by the motion sensor assembly 114, a first slot of the two slots initially receives more infrared radiation, causing a positive differential to be output by the motion sensor assembly 114. When the body leaves the range monitored by the motion sensor assembly 114, a second slot of the two slots receives more infrared radiation, causing a negative differential to be output by the motion sensor assembly 114. Conversely, a negative differential can be output when a body enters the range of the motion sensor assembly 114, and a positive differential can be output when the body leaves the range of the motion sensor assembly 114. As described further herein, in embodiments, the controller 200 uses the positive and negative differentials output from the motion sensor assembly 114 to determine if motion detected by the motion sensor assembly 114 is a visitor of the stone monument 20 at which the motion-activated sound player 100 is installed or a passerby.

Figure 3:
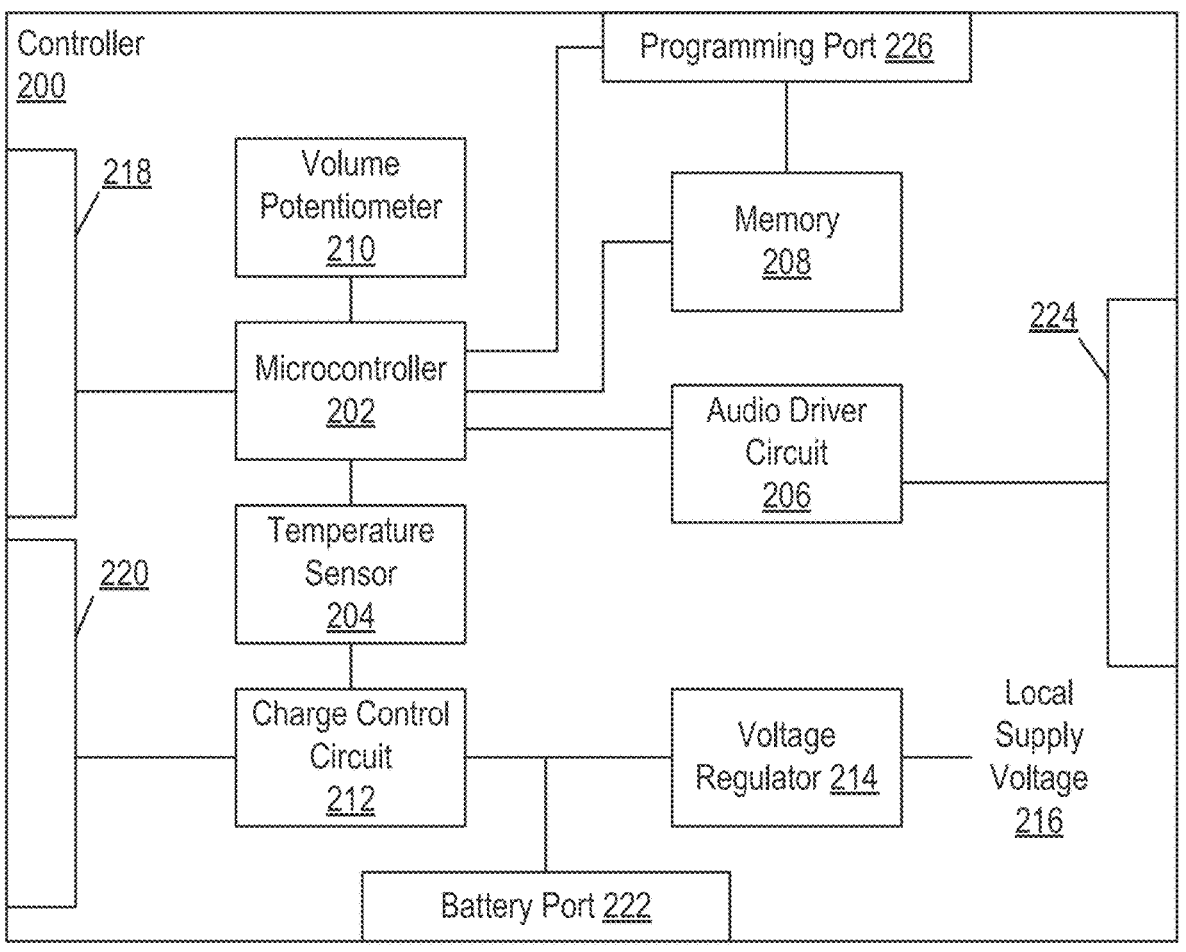
FIG. 3 illustrates a schematic block diagram of an example embodiment of a controller for a motion-activated sound player.

FIG. 3 illustrates a block diagram of an example embodiment of the controller 200. In the illustrated embodiment, the controller 200 includes a microcontroller 202, a temperature sensor 204, an audio driver circuit 206, a memory 208, a volume potentiometer 210, a charge control circuit 212, a voltage regulator 214, a motion sensor port 218, a solar panel port 220, a battery port 222, a speaker port 224, and a programming port 226. In an embodiment, the controller 200 is a printed circuit board assembly.

The microcontroller 202 controls the operation of the controller 200 and the various components within the controller 200. In embodiments, the microcontroller 202 includes a processor configured to execute data instructions stored in the memory 208.

As previously described, the temperature sensor 204 determines an operating temperature of a motion-activated sound player. In an embodiment, the operating temperature is a temperature of a component of the motion-activated sound player, such as a battery, a speaker, or the controller 200.

The controller 200 operates differently based on the operating temperature sensed by the temperature sensor 204. In an embodiment, the microcontroller 202 compares the operating temperature to a predetermined operating temperature range to determine operation of the controller 200. In an example, the microcontroller 202 prevents operation of a speaker if the operating temperature is outside of the predetermined operating temperature range. In another embodiment, the temperature sensor 204 also controls operation of the charge control circuit 212. In an example, if the sensed operating temperature is outside of the predetermined operating temperature range, the charge control circuit 212 prevents charging of a battery. In alternative embodiments, the temperature sensor 204 does not control the charge control circuit 212 directly, and instead the microcontroller 202 controls the charge control circuit 212 based on the operating temperature sensed by the temperature sensor 204.

The audio driver circuit 206 works in conjunction with the microcontroller 202 to output a signal for a speaker. In an example, the audio driver circuit 206 converts signals from the microcontroller 202 into a format that can be input into the speaker. In another example, the audio driver circuit 206 amplifies audio signals from the microcontroller 202. In an embodiment, the audio driver circuit 206 includes a class-D amplifier.

Signals from the audio driver circuit 206 are passed to the speaker port 224 where the signals are then transmitted to the speaker. In an embodiment, the speaker port 224 includes two pins, both of which are used to transmit speaker drive signals. In an example embodiment, the speaker port includes a 3545 Connector manufactured by Keystone Electronics Corp. with its principal place of business in New Hyde Park, NY, and a 3546 Connector also manufactured by Keystone Electronics Corp.

The memory 208 stores data for the controller 200. In an example, the memory stores data instructions defining settings for the controller 200. Examples of settings include the predefined operating temperature range, a maximum playback time, motion sensor ranges, a list of audio tracks playable by the motion-activated sound player, a minimum charge level, a passerby timeframe, a post-playback wait period, and a timeout period length, as described further herein. In another example, the memory 208 stores one or more audio tracks for playback by the motion-activated sound player. In embodiments, the one or more audio tracks are stored in an ordered playlist. In embodiments, the memory 208 also stores data instructions that enables to the motion-activated sound player to perform the functions described herein. In an embodiment, the memory 208 comprises secure digital (SD) flash memory.

The volume potentiometer 210 controls a playback volume of the motion-activated sound player. In embodiments, the volume potentiometer 210 provides a voltage control input to the microcontroller 202 to define the playback volume of the motion-activated sound player. In an embodiment, the volume potentiometer 210 is a variable resistor. In alternative embodiments, the controller 200 does not include the volume potentiometer 210, and the playback volume is instead controlled by a programmable playback volume level stored in the memory 208.

The charge control circuit 212, the voltage regulator 214, the solar panel port 220, and the battery port 222 make up a power subsystem of the controller 200. The charge control circuit 212 controls charging of a battery. The charge control circuit 212 receives energy from a solar panel assembly through the solar panel port 220, and when the charge control circuit 212 determines that the battery needs to be charged, the charge control circuit 212 transfers the energy from the solar panel to the battery port 222, where the energy is transferred to the battery. In an embodiment, the solar panel port 220 includes two pins: a first pin for a solar panel power supply signal and a second pin for a solar panel power return signal. In an embodiment, the battery port 222 includes two pins: a first pin for a battery positive power terminal and a second pin for a battery negative power terminal. In embodiments, the operation of the charge control circuit 212 is controlled by the temperature sensor 204 or the microcontroller 202 to prevent the charge control circuit 212 from recharging the battery when an operating temperature is outside of a predetermined operating temperature range.

The voltage regulator 214 supplies a local supply voltage 216 for the controller 200. The local supply voltage is a steady supply voltage used by the components of the controller 200. For ease of illustration, the voltage regulator 214 is shown feeding into the local supply voltage 216 rather than illustrating connections between the voltage regulator 214 and each of the other components of the controller 200. In an embodiment, the voltage regulator 214 draws power from the battery through the battery port 222 to supply the local supply voltage 216. In alternative embodiments, the voltage regulator 214 additionally or alternatively draws power from the solar panel assembly through the solar panel port 220 and the charge control circuit 212.

The motion sensor port 218 connects a motion sensor assembly to the controller 200. As previously discussed, signals from the motion sensor assembly are sent to the controller 200 when the motion sensor assembly determines that a visitor is proximate to the motion-activated sound speaker, and the controller 200 causes the speaker to play audio. In the illustrated embodiment, signals from the motion sensor port 218 are received by the microcontroller 202. In an embodiment, the motion sensor port 218 includes connections for three signals between the controller 200 and the motion sensor assembly: a first signal for a motion sensor power supply, a second signal for a motion sensor detection signal, and a third signal for a ground reference. In an example, the second signal for the motion sensor detection signal is a logic signal, and the controller 200 interprets a change in the second signal as an indication that motion was detected.

As described above, in some embodiments, the motion sensor assembly outputs positive differentials and negative differentials when the motion sensor assembly detects motion from an object entering and exiting the range of the motion sensor assembly. In examples of these embodiments, the controller 200 uses the positive and negative differentials to determine if a visitor is visiting a stone monument at which the motion-activated sound player is installed or if the detected motion is from a passerby. For example, if the controller 200 receives a positive differential signal followed quickly by a negative differential signal, the controller 200 determines the motion sensed by the motion sensor assembly is from a passerby, and the controller 200 does not initiate playback of an audio track. The controller 200 operates similarly if a negative differential signal is followed quickly by a positive differential signal. However, if the controller 200 receives a positive differential signal with no corresponding negative differential signal within a predetermined passerby timeframe—or a negative differential signal with no corresponding positive differential signal within the predetermined passerby timeframe—the controller 200 determines that the motion sensed by the motion sensor assembly is from a visitor, and the controller initiates playback of an audio track. In an example, the passerby timeframe is 3 seconds. In embodiments, the passerby timeframe is customizable.

In an embodiment, the motion sensor port 218 and the solar panel port 220 are combined in an external connection port. In an example of such an embodiment, the external connection port includes a 5-pin connector: a first pin for a solar panel power supply signal, a second pin for a solar panel power return signal, a third pin for a motion sensor power supply, a fourth pin for a motion sensor detection signal, and a fifth pin for a ground reference. An example of the 5-pin connector includes a IPL1-105-02-L-S-K connector manufactured by Samtec Inc. with its principal place of business in New Albany, IN.

The programming port 226 allows external computing devices to communicate with the controller 200 to change settings of the motion-activated sound player. In an example, a computing device connected to the controller 200 through the programming port 226 can change a predefined operating temperature range, a maximum playback time, motion sensor ranges, a list of audio tracks playable by the motion-activated sound player, a minimum charge level, a passerby timeframe, a post-playback wait period, and a timeout period length. In an embodiment, the programming port 226 is connected to the microcontroller 202, and the microcontroller 202 changes settings stored in the memory 208 based on signals from the programming port 226. In alternative embodiments, the programming port 226 is additionally or alternatively connected to the memory 208, and signals from the programming port 226 go directly to the memory 208 to modify settings stored in the memory 208.

In an embodiment, the programming port 226 is configured to allow a wired connection with an external computing device. In an example embodiment in which the programming port 226 is configured for wired connections, the programming port 226 includes a 10-pin pad field compatible with a TC2050-IDC programming cable manufactured by Tag-Connect LLC with its principal place of business in Burlingame, CA. In this embodiment, the programming port 226 has four data signal pins, a clock signal pin, a ground reference pin, a command signal pin, a power pin, a programming enable pin, and a tenth pin not connected.

In alternative embodiments, in addition or alternative to the programming port 226, the controller 200 includes a wireless interface configured to allow wireless communication with a computing device to change settings of the motion-activated sound player. In an example, the wireless interface includes a Bluetooth interface. Like with the programming port 226, the wireless interface may be connected to the microcontroller 202 and/or the memory 208.

Figure 4:
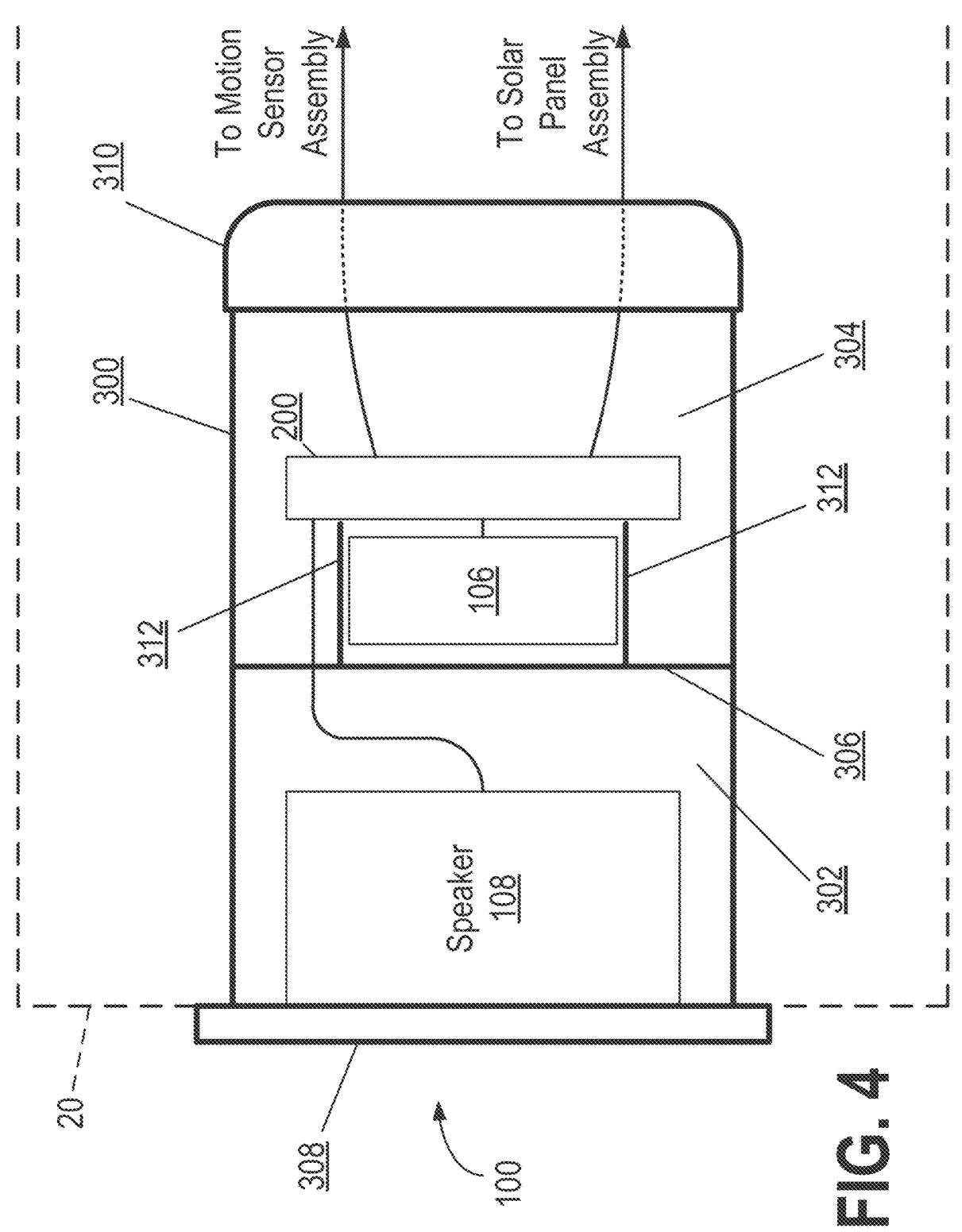
FIG. 4 illustrates an example embodiment of a motion-activated sound player arranged within a capsule installed at a stone monument.

FIG. 4 illustrates an example embodiment of the motion-activated sound player 100 arranged within a capsule 300 installed at a stone monument 20. In the illustrated embodiment, the capsule 300 houses the controller 200, the battery 106, and the speaker 108. The solar panel assembly 112 and the motion sensor assembly 114 are external to the capsule 300 and are connected to the controller 200 via cables extending through the stone monument 20. The capsule is sealed using an external face plate 308 that is exposed on a face of the stone monument 20 and an end cap 310. In embodiments, the face plate 308 and the end cap 310 are removable, allowing access to the components within the capsule 300 when removed.

In the illustrated embodiment, the capsule 300 includes a cavity divider 306 which defines two cavities 302, 304 within the capsule 300. In these embodiments, a first cavity 302 houses the speaker 108, and a second cavity 304 houses the battery 106 and the controller 200. An aperture 318 (shown in FIGS. 8-9) in the cavity divider 306 allows the speaker 108 to have a wired connection with the controller 200 despite the speaker 108 and the controller 200 being in different cavities 302, 304. The cavity divider 306 provides greater protection for the battery 106 and the controller 200 from moisture by adding an additional layer between the battery 106 and the controller 200 and outdoor conditions that can include rain and snow. In alternative embodiments, the capsule 300 may include multiple cavity dividers 306 defining additional cavities 302, 304. Additionally, in alternative embodiments, the components of the motion-activated sound player 100 are arranged in different configurations within the cavities 302, 304—e.g., the battery 106 may be in the first cavity 302 with the speaker 108.

The capsule 300 also includes standoffs 312 within the second cavity 304. The standoffs 312 help maintain separation between the battery 106 and the controller 200. By providing separation between the battery 106 and the controller 200, the standoffs 312 act as temperature elements, substantially preventing contact between the battery 106 and the controller 200 through which heat could transfer from the battery 106 to the controller 200, or vice versa, that causes the battery 106 or the controller 200 to overheat.

FIGS. 5-7 illustrate alterative embodiments of the motion-activated sound player 100 arranged within a capsule 300 installed at a stone monument 20. The alternative embodiments offer different configurations of the capsule 300 that provide additional temperature elements or enable previously described components to act as temperature elements. Further embodiments may combine elements of the embodiments shown in FIGS. 4-7.

FIG. 5 illustrates an example embodiment of the capsule 300 that includes heating elements 314. In the illustrated embodiment, the heating elements 314 are positioned proximate to the speaker 108, the battery 106, and the controller 200 within the capsule 300. In embodiments, the heating elements 314 are connected to walls of the capsule 300 and the standoffs 312. In an example embodiment, the heating elements 314 are heating coils, which convert electricity supplied by the controller 200 into heat. In alternative embodiments, the heating elements 314 can be any component capable of converting electricity into heat.

The heating elements 314 can selectively produce heat to increase the operating temperature of the motion-activated sound player 100, particularly when the operating temperature is approaching or drops below a lower limit of a predefined operating temperature range. Although not shown for ease of illustration, the heating elements 314 can be electrically connected to and controlled by the controller 200. When the temperature sensor 204 in the controller 200 determines that the operating temperature is below the lower limit of the predefined operating temperature range—or is approaching the lower limit of the predefined operating temperature range (e.g., is within 5° C. of the lower limit)—the controller 200 activates the heating elements 314 to produce heat, which may cause the operating temperature to increase.

FIG. 6 illustrates another example embodiment configured to maintain an operating temperature above a lower limit of a predefined operating temperature range. In contrast to the embodiment depicted in FIG. 5, the embodiment depicted in FIG. 6 does not include additional heating elements 314 and instead uses heat produced by the components of the motion-activated sound player 100—such as the battery 106—to increase the operating temperature when necessary. When the temperature sensor 204 determines that the operating temperature is below or approaching the lower limit of the predefined operating temperature range, the controller 200 causes components of the motion-activated sound player 100 to activate, consuming electricity and in turn producing heat. In an example, the controller 200 causes the battery 106 to discharge to produce heat. In another example, the controller 200 uses the speaker 108 to produce heat. In such an example, the controller 200 may cause the speaker 108 to play sounds at a low volume or at a frequency outside of the human audible spectrum such that individuals in the vicinity of the motion-activated sound player 100 do not hear the motion-activated sound player 100 when the speaker 108 is activated for the purposes of producing heat to increase the operating temperature.

In the illustrated embodiment, the capsule 300 does not include a cavity divider 306 like in the embodiment shown in FIGS. 4 and 5. Without the cavity divider 306, heat produced by the components of the motion-activated sound player 100 can more easily increase the operating temperature—e.g., heat produced by the battery 106 can more easily heat up the capsule 300. In alternative embodiments, the capsule 300 includes the cavity divider 306.

FIG. 7 illustrates an example embodiment of the capsule 300 that includes heat sink 316. The heat sink 316 draws heat away from electrical components of the motion-activated sound player 100 to help maintain the operating temperature below an upper limit of the predetermined operating temperature range. In embodiments, the heat sink 316 transfers heat from the electrical components into the stone monument 20 in which the motion-activated sound player 100 is installed, cooling the electrical components. In an example, the heat sink 316 is made of aluminum. In another example, the heat sink 316 is made of copper. In further examples, the heat sink 316 is made of any metal or other type of material with high thermal conductivity.

In the illustrated embodiment, the heat sink 316 makes contact with the battery 106 to dissipate heat from the battery 106. The heat sink 316 extends through the capsule 300 to make contact with the stone monument 20 to transfer the heat from the battery 106 to the stone monument 20, cooling the battery 106. In further embodiments, the heat sink 316 additionally or alternatively makes contact with other electrical components in the capsule 300, such as the speaker 108 and the controller 200. In an example, the standoffs 312 are part of the heat sink 316 and made of the same material as the heat sink 316, making contact with the controller 200 to diffuse heat from the controller 200 into the stone monument 20. In another example, the cavity divider 306 is removed and the heat sink 316 divides the cavities 302, 304, allowing the heat sink 316 to make contact with the speaker 108 in the first cavity 302 and the battery 106 and controller 200 in the second cavity 304.

Figure 8:
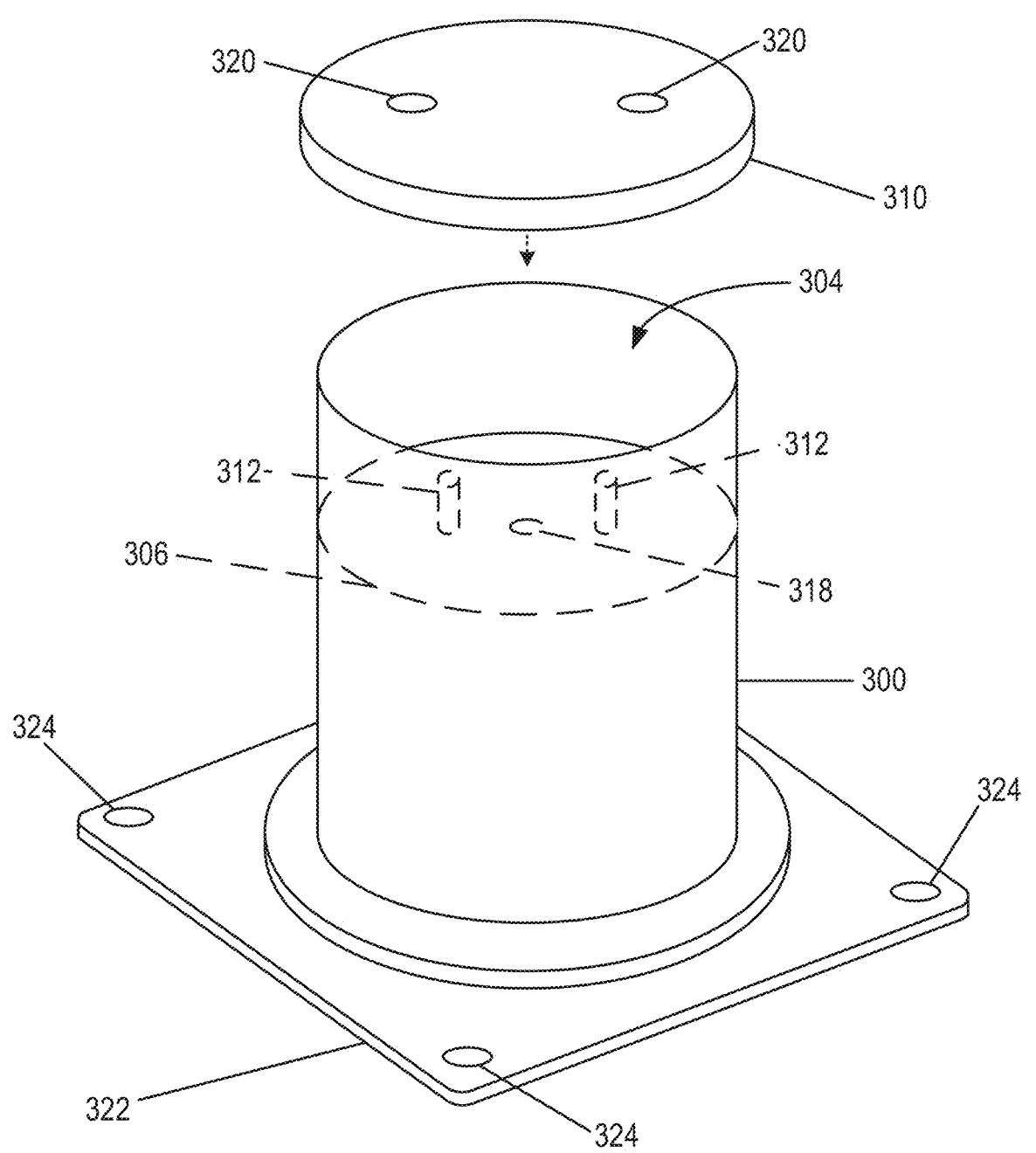
FIG. 8 illustrates an isometric view of a capsule for a motion-activated sound player.
Figure 9:
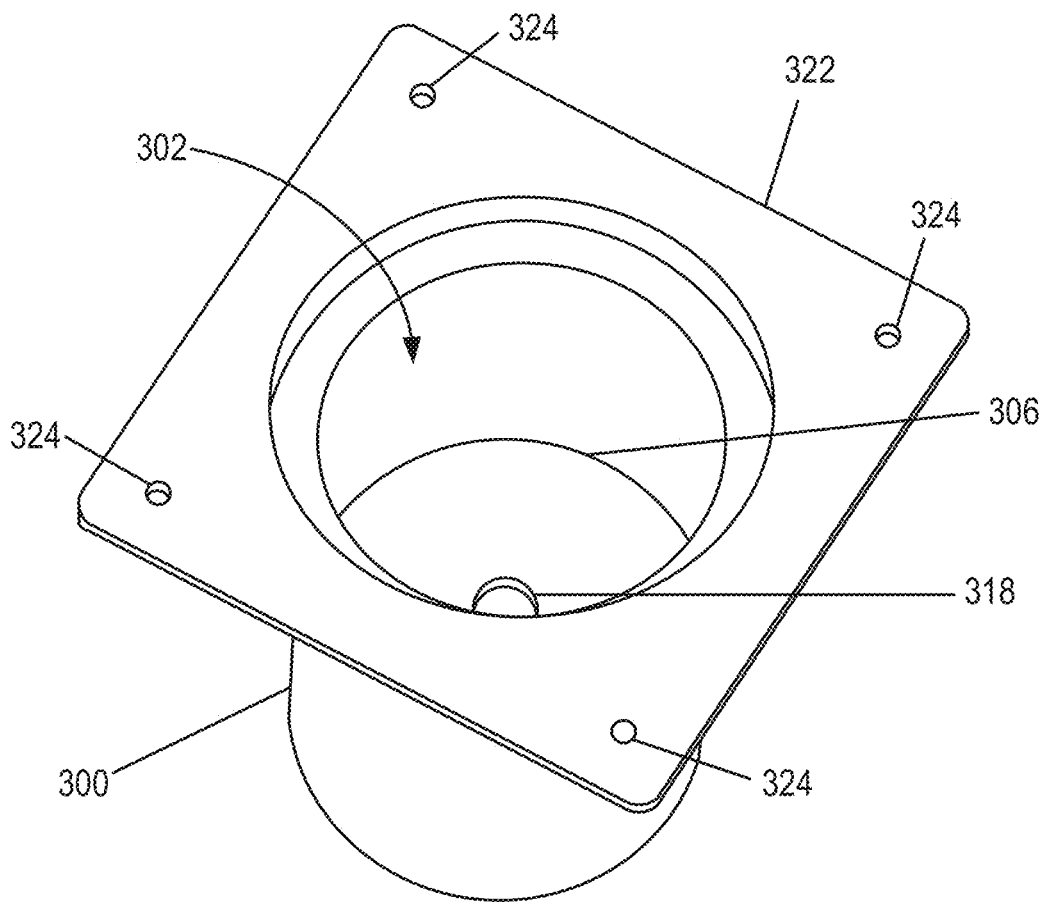
FIG. 9 illustrates an isometric view of a capsule for a motion-activated sound player.
Figure 10:
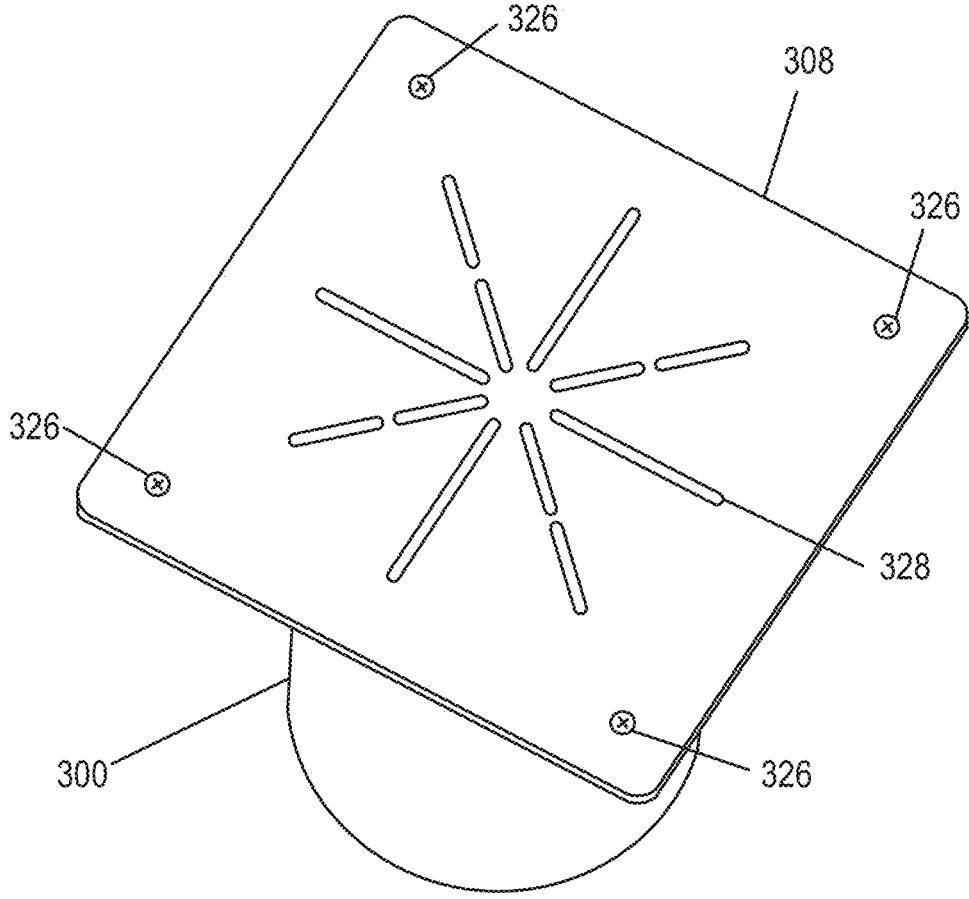
FIG. 10 illustrates an isometric view of a capsule for a motion-activated sound player with a face plate.

Turning to FIGS. 8-10, an example embodiment of the capsule 300 is shown. In the illustrated embodiment, the capsule 300 is generally cylindrical in shape. In embodiments, the capsule 300 is made substantially of plastic. In alternative embodiments, the capsule 300 is made of any weather and water-resistant material.

As previously described, the capsule 300 includes a cavity divider 306 to define a first cavity 302 (shown in FIG. 9) and a second cavity 304. Standoffs 312 are attached to the cavity divider 306 within the second cavity 304, which maintain separation between a battery and a controller, as previously described. The cavity divider 306 also includes an aperture 318 through which a wired connection can be maintained between electrical components in the first cavity 302—such as a speaker—and electrical components in the second cavity 304—such as a controller. In embodiments, the aperture 318 is a minimum size through which a wired connection is still capable of being maintained. As previously described, the cavity divider 306 helps to protect electrical components in the second cavity 304 from external moisture, such as rain and snow, so having a large aperture 318 may reduce the protection provided by the cavity divider 306.

An end cap 310 seals the second cavity 304. In an embodiment, the end cap 310 is removable, allowing access to the electrical components within the second cavity 304. In an example embodiment, the end cap 310 includes threads that interact with corresponding threads on the capsule 300 with which the end cap 310 can screw onto the capsule 300. In another example embodiment, the end cap 310 has a circumference slightly greater than a circumference of the capsule 300, allowing the end cap 310 to maintain a tight fit with the capsule 300 when pressed onto the capsule 300.

In the illustrated embodiment, the end cap 310 includes apertures 320 through which a wired connection can be maintained between electrical components in the second cavity 304—such as a controller—and external electrical components—such as a solar panel assembly and a motion sensor assembly. Like with the aperture 318, in embodiments, the apertures 320 are a minimum size through which a wired connection is still capable of being maintained to minimize the amount of moisture that can enter the capsule 300 through the apertures 320.

A face plate 308 seals the first cavity 302. The face plate 308 is made of weather resistant materials, as it is the most exposed component of the motion-activated sound player to weather conditions. In an example embodiment, the face plate 308 is made substantially of stainless steel.

In embodiments, the face plate 308 includes apertures 328, allowing sound from a speaker in the first cavity 302 to more easily be heard through the face plate 308. In the illustrated embodiment, the face plate 308 attaches to a front face 322 of the capsule 300 using fasteners 326. The fasteners 326 extend through apertures 324 in the front face 322 to attach the face plate 308 to the front face 322. In an example, the apertures 324 are threaded and the fasteners 326 are screws. In alternative embodiments, other types of mechanical fasteners are used, such as nuts and bolts, nails, or rivets. In further embodiments, other attachment mechanisms are used, including adhesives.

Figure 11:
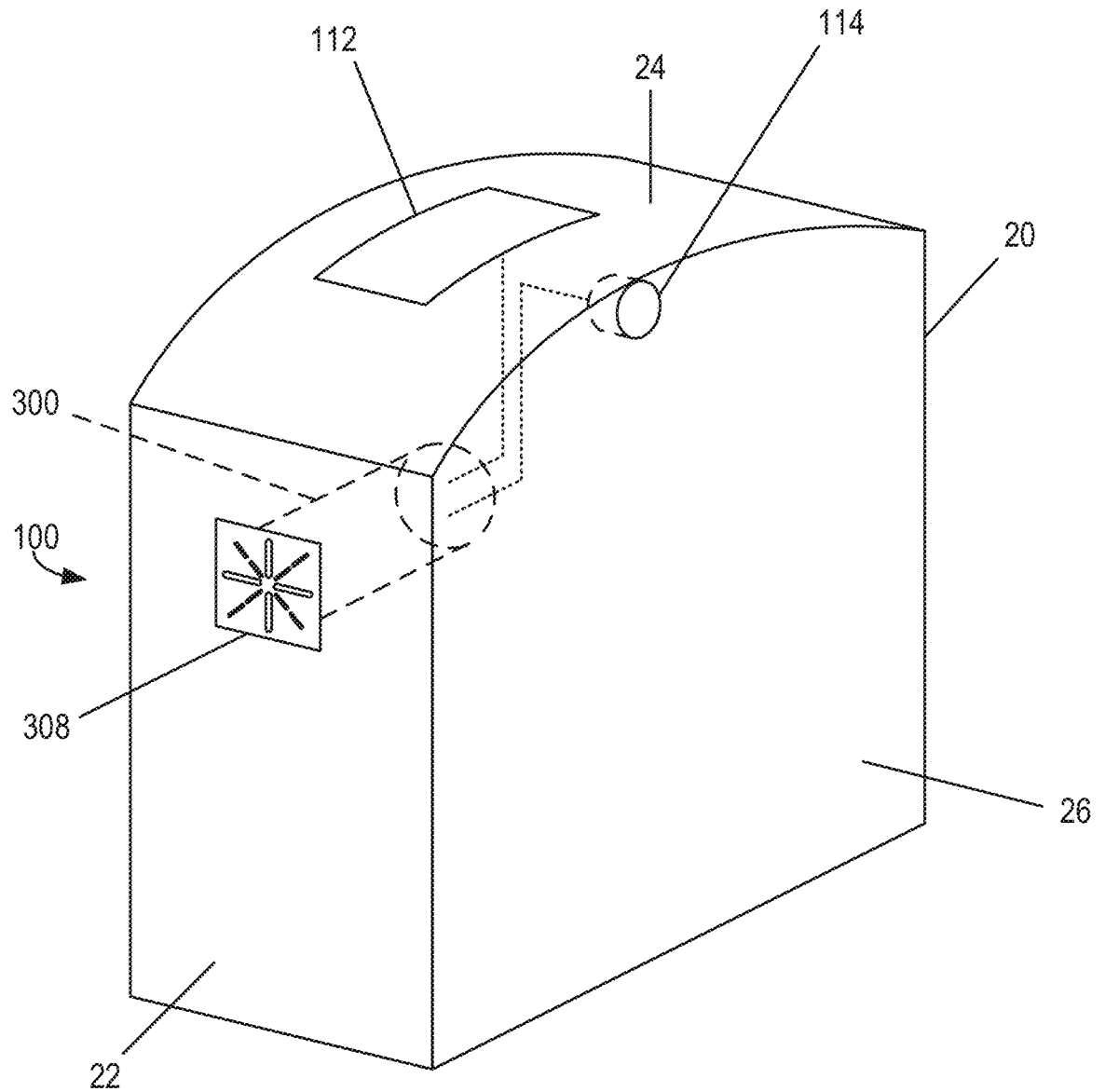
FIG. 11 illustrates an example of a motion-activated sound player installed at a stone monument.

Referring now to FIG. 11, an example embodiment of the motion-activated sound player 100 installed in a stone monument 20 is shown. In the illustrated embodiment, the stone monument 20 is a gravestone with a side face 22, a top face 24, and a front face 26. The capsule 300 of the motion-activated sound player 100 is installed into a bore in the side face 22 of the stone monument 20. The face plate 308 substantially covers the bore, helping to keep moisture out of the bore and away from the capsule 300. In embodiments, the capsule 300 is removable from the stone monument 20. The capsule 300 can be removed to allow access for a computing device to establish a wired connection with the motion-activated sound player 100—for example, a wired connection can be established through a programming port to modify settings of the motion-activated sound player 100.

The solar panel assembly 112 is installed on the top face 24 of the stone monument 20. By installing the solar panel assembly 112 on the top face 24, the solar panel assembly 112 is exposed to more sunlight and can provide more electricity to the motion-activated sound player 100. In an embodiment, the solar panel assembly 112 is attached to anchors mounted into the stone monument 20 to attach the solar panel assembly 112 to the top face 24. In alternative embodiments, the solar panel assembly 112 is attached to the top face 24 using other attachment methods, such as using other fasteners or adhesives.

The motion sensor assembly 114 is installed on the front face 26 of the stone monument 20. By installing the motion sensor assembly 114 on the front face 26, the motion sensor assembly 114 can detect when visitors approach the front face 26 of the stone monument 20. In an embodiment, the motion sensor assembly 114 is installed in a bore in the front face 26, reducing the visibility of the motion sensor assembly 114 from visitors visiting the stone monument 20 and better protecting the motion sensor assembly 114 from weather conditions. In alternative embodiments, the motion sensor assembly 114 is attached to the front face 26 using other attachment methods, such as using fasteners or adhesives.

The solar panel assembly 112 and the motion sensor assembly 114 have a wired connection with electrical components in the capsule 300. In the illustrated embodiment, the wired connections between the capsule 300 and the solar panel assembly 112 and the motion sensor assembly 114 are maintained through channels carved through the stone monument 20. In alternative embodiments, the wired connections between the capsule 300 and the solar panel assembly 112 and the motion sensor assembly 114 are external to the stone monument 20. In further embodiments, the connection between the motion sensor assembly 114 and the capsule 300 is wireless.

Figure 12:
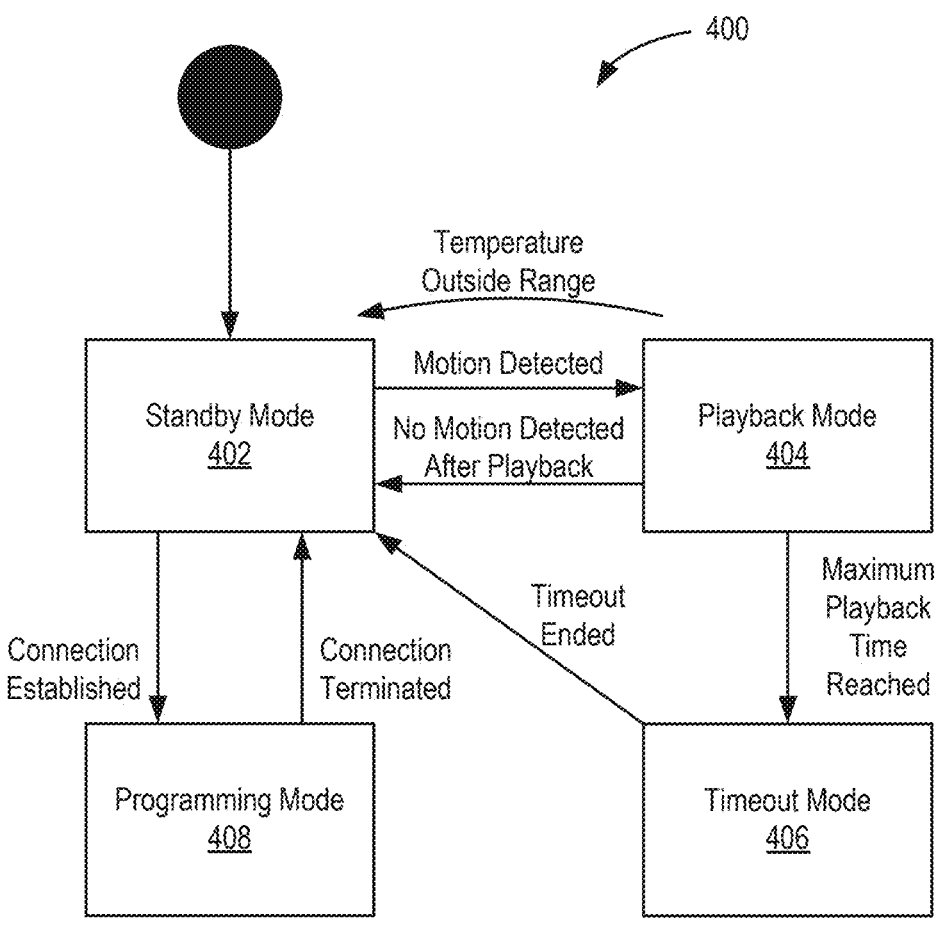
FIG. 12 illustrates an example state diagram of a motion-activated sound player.

FIG. 12 illustrates an example state diagram 400 of a motion-activated sound player. In the illustrated embodiment, the motion-activated sound player operates in four states: standby mode 402, playback mode 404, timeout mode 406, and programming mode 408.

Standby mode 402 is the default state of the motion-activated sound player. While operating in standby mode 402, the motion-activated sound player operates in a low power state in which audio is not enabled and the motion-activated sound player is monitoring for nearby motion and connections with external computing devices.

The motion-activated sound player also monitors an operating temperature while in standby mode 402. In embodiments, if the operating temperature is determined to be outside of a predetermined operating temperature range or approaching an upper limit or a lower limit of the predetermined operating temperature range (e.g., the operating temperature is within 5° C. of the upper/lower limit), the motion-activated sound player uses temperature elements to maintain the operating temperature within the predetermined operating temperature range. In an example, the motion-activated sound player uses heating coils to increase the operating temperature if the operating temperature is below or approaching the lower limit of the predetermined operating temperature range. In alternative embodiments, the motion-activated sound player uses passive temperature elements, such as a heat sink, to maintain the operating temperature within the predetermined operating temperature range and does not actively trigger the temperature elements in response to the sensed operating temperature being outside or approaching the upper or lower limits of the predetermined operating temperature range.

As previously described, a motion sensor assembly is used to monitor for motion within a programmed range. When motion is detected by the motion sensor assembly, the motion-activated sound player transitions into playback mode 404. In some embodiments, as previously described, signals from the motion sensor assembly—such as positive and negative differentials—are used to determine if the motion sensed is from a visitor or a passerby. In such embodiments, the motion-activated sound player transitions into playback mode 404 if the motion is determined to be from a visitor, but not if the motion is determined to be from a passerby.

In playback mode 404, the motion-activated sound player plays audio. In an embodiment, the audio played by the motion-activated sound player includes at least a portion of one or more audio tracks. The motion-activated sound player selects an audio track to play from among one or more audio tracks stored in a memory of the motion-activated sound player. In embodiments, the one or more audio tracks are ordered as a playlist, and the motion-activated sound player progresses through the playlist as audio tracks are selected. In an example embodiment, the motion-activated sound player tracks the last audio track that is played at the end of an instance in which the motion-activated sound player is operating in playback mode 404 so that the next time the motion-activated sound player enters playback mode 404, the next audio track in the playlist is selected—e.g., if the motion-activated sound player ended an instance of operating in playback mode 404 by playing the fourth audio track in the playlist, the fifth audio track in the playlist is selected the next time the motion-activated sound player enters playback mode 404.

In embodiments, the motion-activated sound player plays the selected audio track, and after playback of the audio track is complete, the motion-activated sound player monitors for motion for a predetermined post-playback wait period—e.g., two minutes. If motion is detected during the wait period, the motion-activated sound player selects another audio track from the one or more audio tracks for playback. If no motion is detected during the wait period, the motion-activated sound player returns to standby mode 402. In an embodiment, the motion-activated sound player remains in playback mode 404 until the motion-activated sound player goes through a complete wait period in which no motion is detected, at which point the motion-activated sound player transitions back to standby mode 402. In embodiments, the post-playback wait period is a setting stored in a memory of the motion-activated sound player that is customizable.

In an alternative embodiment, the motion-activated sound player remains in playback mode 404 until the earlier of the motion-activated sound player going through a complete wait period in which no motion is detected or a maximum playback time being reached. In this embodiment, if the motion-activated sound player goes through a complete wait period in which no motion is detected, the motion-activated sound player returns to standby mode 402. If the maximum playback time is reached, the motion-activated sound player transitions into timeout mode 406. As previously described, the maximum playback time is a setting stored in the memory of the motion-activated sound player which is customizable in some embodiments. In an example, the maximum playback time is two hours. In a further embodiment, the motion-activated sound player remains in playback mode 404 until the earlier of the motion-activated sound player going through a complete wait period in which no motion is detected or a battery level falling below a minimum charge level. In this embodiment, if the motion-activated sound player goes through a complete wait period in which no motion is detected, the motion-activated sound player returns to standby mode 402. If the battery level falls below the minimum charge level, the motion-activated sound player transitions into timeout mode 406. As previously described, the minimum charge level is a setting stored in the memory of the motion-activated sound player which is customizable in some embodiments.

While in the timeout mode 406, playback of audio is disabled. In embodiments, the motion-activated sound player remains in timeout mode 406 for a predetermined timeout period—e.g., 30 minutes. As previously described, the predetermined timeout period is a setting stored in the memory of the motion-activated sound player which is customizable in some embodiments. By remaining in timeout mode 406 for the predetermined timeout period, the battery of the motion-activated sound player has an opportunity to recharge. After the predetermined timeout period ends, the motion-activated sound player transitions from timeout mode 406 to standby mode 402.

From standby mode 402, the motion-activated sound player can also transition into programming mode 408. When a connection is established between the motion-activated sound player and an external computing device while the motion-activated sound player is in standby mode 402, the motion-activated sound player transitions into programming mode 408. As previously described, the connection between the motion-activated sound player and the external computing device can be wired or wireless, depending on the embodiment of the motion-activated sound player. In alternative embodiments, the motion-activated sound player can transition from playback mode 404 and timeout mode 406 to programming mode 408 when a connection is established with the external computing device.

While in programming mode 408, audio playback is disabled and the motion-activated sound player receives programming instructions from the external computing device to change settings of the motion-activated sound player. In examples, the external computing device changes settings related to a predefined operating temperature range, a maximum playback time, motion sensor ranges, a list of audio tracks playable by the motion-activated sound player, a minimum charge level, a passerby timeframe, a post-playback wait period, and a timeout period length. After the settings are customized and the connection with the external computing device is terminated, the motion-activated sound player returns to standby mode 402.

In some embodiments, the motion-activated sound player also considers the operating temperature when transitioning between states. In an example, while in standby mode 402, in addition to monitoring for motion with the motion sensor assembly, the motion-activated sound player also monitors the operating temperature for use in determining whether to transition into playback mode 404. In these embodiments, if the operating temperature is outside of the predetermined operating temperature range, the motion-activated sound player does not transition into playback mode 404, even if the motion sensor assembly detects motion. In another example, while in playback mode 404, if the operating temperature moves outside the predetermined operating temperature range, the motion-activated sound player returns to standby mode 402.

Figure 13:
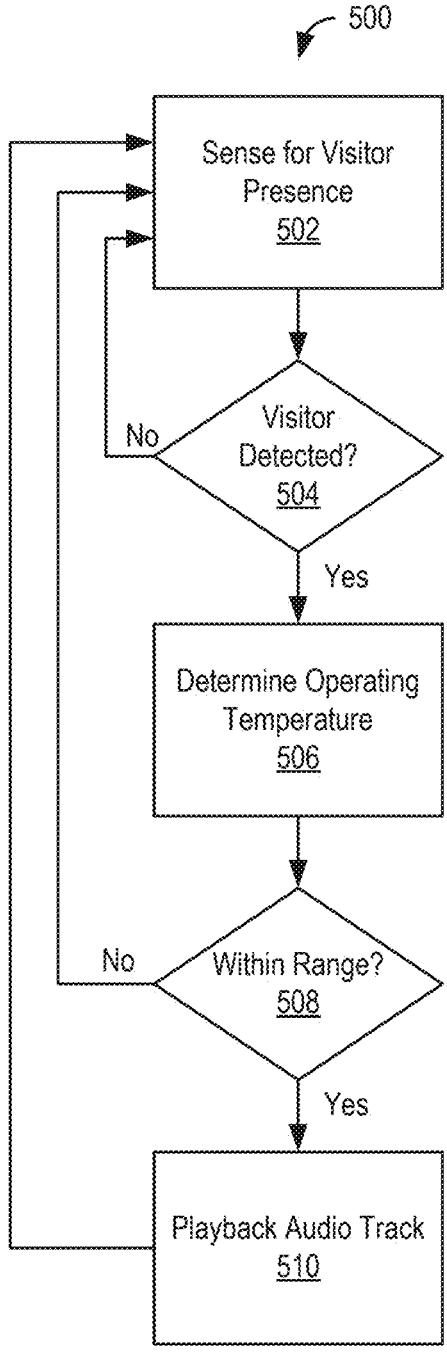
FIG. 13 illustrates a flowchart of an example method for playing audio with a motion-activated sound player.

FIG. 13 illustrates a flowchart of an example method 500 for playing audio using a motion-activated sound player. The method 500 includes operations 502, 504, 506, 508, 510.

The operation 502 is performed to sense for the presence of a visitor. In embodiments, the presence of a visitor is sensed by monitoring for motion in a predetermined range around the motion-activated sound player. In an example, the operation 502 is performed by a motion sensor assembly. In embodiments, the motion sensor assembly includes a passive infrared sensor.

The operation 504 is performed to determine if a visitor is detected. In embodiments, if motion is detected during the operation 502, it is determined that a visitor is detected. In alternative embodiments, motion detected during the operation 502 is differentiated between motion from a visitor and motion from a passerby. In embodiments, the operation 504 is performed by a controller in the motion-activated sound player. In examples in which motion is differentiated between a visitor and a passerby, the controller determines if a positive differential is quickly followed by a negative differential (or vice versa). If a positive differential is followed by a negative differential within a predetermined passerby timeframe, the motion is determined to be from a passerby. If the positive differential is not followed by a negative differential within the predetermined passerby timeframe, the motion is determined to be from a visitor. If a visitor is detected, the method 500 proceeds to the operation 506. If a visitor is not detected, the method 500 returns to the operation 502.

The operation 506 is performed to determine an operating temperature of the motion-activated sound player. In embodiments, the operating temperature is a temperature of one or more components of the motion-activated sound player. In alternative embodiments, the operating temperature is an ambient temperature within the motion-activated sound player. In an example, the operation 506 is performed by a temperature sensor in the motion-activated sound player. In embodiments, the temperature sensor is included in a controller of the motion-activated sound player. In embodiments, the temperature sensor monitors temperatures of one or more components of the motion-activated sound player, such as a battery, the controller, or a speaker.

The operation 508 is performed to determine if the operating temperature determined during the operation 506 is within a predetermined operating temperature range. By comparing the operating temperature to the predetermined operating temperature range, the motion-activated sound player can be protected from operating in temperatures that can cause damage to components of the motion-activated sound player. In embodiments, the operation 508 is performed by a controller of the motion-activated sound player. In an example embodiment, the predetermined operating temperature range is a setting stored in a memory of the motion-activated sound player and is customizable based on programming by a user. If the operating temperature is not within the predetermined operating temperature range, the method 500 returns to the operation 502. If the operating temperature is within the predetermined operating temperature range, the method 500 proceeds to the operation 510.

The operation 510 is performed to playback an audio track. In an embodiment, a controller selects an audio track from a memory and causes a speaker to play the audio track. In an example, the audio track is part of an ordered playlist of audio tracks, and the audio track is selected for playback based on which audio track of the playlist was most recently played—i.e., the audio track that is selected during the operation 510 is the next audio track in the playlist. In an embodiment, the operation 510 includes transitioning the motion-activated sound player from a standby mode to a playback mode. After playback of the audio track is completed, the method 500 returns to the operation 502, and the method 500 can loop. In embodiments, when the method 500 returns to the operation 502, the motion-activated sound player transitions back to the standby mode.

In alternative embodiments, the method 500 returns to the operation 502 before the audio track is played completely. In an example, if the operating temperature leaves the predetermined operating temperature range during the operation 510, playback of the audio track ends, and the method returns to the operation 502. In another example, if a battery level of the motion-activated sound player falls below a predetermined minimum charge level, playback of the audio track ends, and the method returns to the operation 502.

The method 500 can include additional or alternative operations in other embodiments. For example, in some embodiments, after playback of the audio track during the operation 510, the motion-activated sound player compares the current playback time to a maximum playback time, and if the current playback time is greater than or equal to the maximum playback time, the motion-activated sound player enters a timeout mode for a predetermined amount of time, as described above. In another example, if the operating temperature is determined to be outside of the predetermined operating temperature range, the motion-activated sound player uses temperature elements to control the operating temperature—e.g., heating coils are activated to produce heat and increase the operating temperature.

The operations 502, 504, 506, 508, 510 can also be performed in a different order than shown in FIG. 13. For example, in some embodiments, the operations 506, 508 to determine the operating temperature and compare it to the predetermined operating temperature range are performed before the operations 502, 504 to sense for visitor presence and determine if a visitor was detected.

Figure 14:
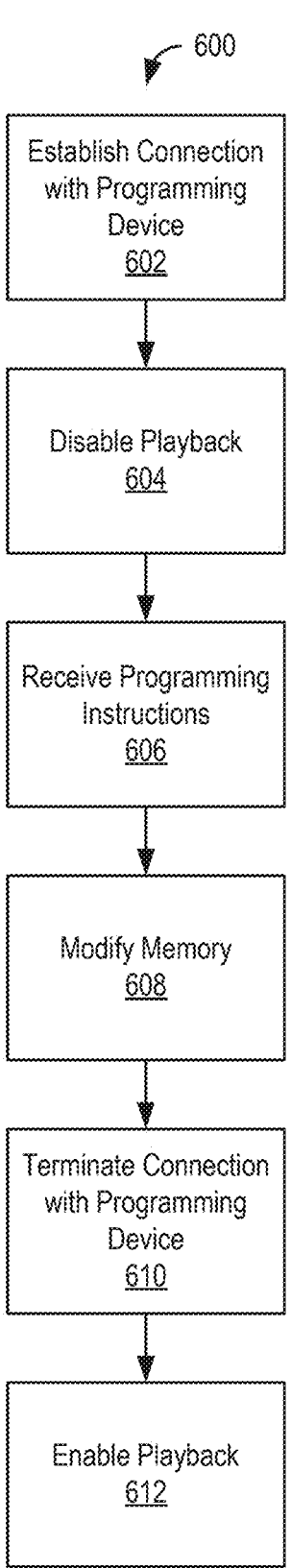
FIG. 14 illustrates a flowchart of an example method for modifying settings of a motion-activated sound player.

FIG. 14 illustrates a flowchart of an example method 600 for modifying settings of a motion-activated sound player. The method 600 includes operations 602, 604, 606, 608, 610, 612.

The operation 602 is performed to establish a connection between the motion-activated sound player and a computing device. In an embodiment, a wired connection is established between the devices. In such embodiments, the wired connection is established with a programming port on a controller of the motion-activated sound player. In alternative embodiments, a wireless connection is established between the devices, such as a Bluetooth connection. In such embodiments, the wireless connection is established through a wireless interface in the controller of the motion-activated sound player.

The operation 604 is performed to disable audio playback by the motion-activated sound player. In an embodiment, a controller of the motion-activated sound player determines that a computing device is connected with the motion-activated sound player and transitions the motion-activated sound player into a programming mode in which playback is disabled.

The operation 606 is performed to receive programming instructions. The programming instructions are received from the computing device connected to the motion-activated sound player during the operation 602. In embodiments, the programming instructions describe modifications of settings of the motion-activated sound player, including a predefined operating temperature range, a maximum playback time, motion sensor ranges, a list of audio tracks playable by the motion-activated sound player, a minimum charge level, a passerby timeframe, a post-playback wait period, and a timeout period length. In an example, the programming instructions are received by a controller through a programming port.

The operation 608 is performed to modify settings of the motion-activated sound player according to the programming instructions received during the operation 606. In an embodiment, a controller modifies a memory of the motion-activated sound player. In alternative embodiments, the computing device connects directly with the memory of the motion-activated sound player to modify the memory.

The operation 610 is performed to terminate the connection between the computing device and the motion-activated sound player. After the connection is terminated, the method 600 proceeds to the operation 612 in which playback is reenabled. In an embodiment, reenabling playback includes to transition the motion-activated sound player from the programming mode to a standby mode in which playback is not directly enabled but from which the motion-activated sound player can transition into a playback mode upon detection of a visitor.

Figure 15:
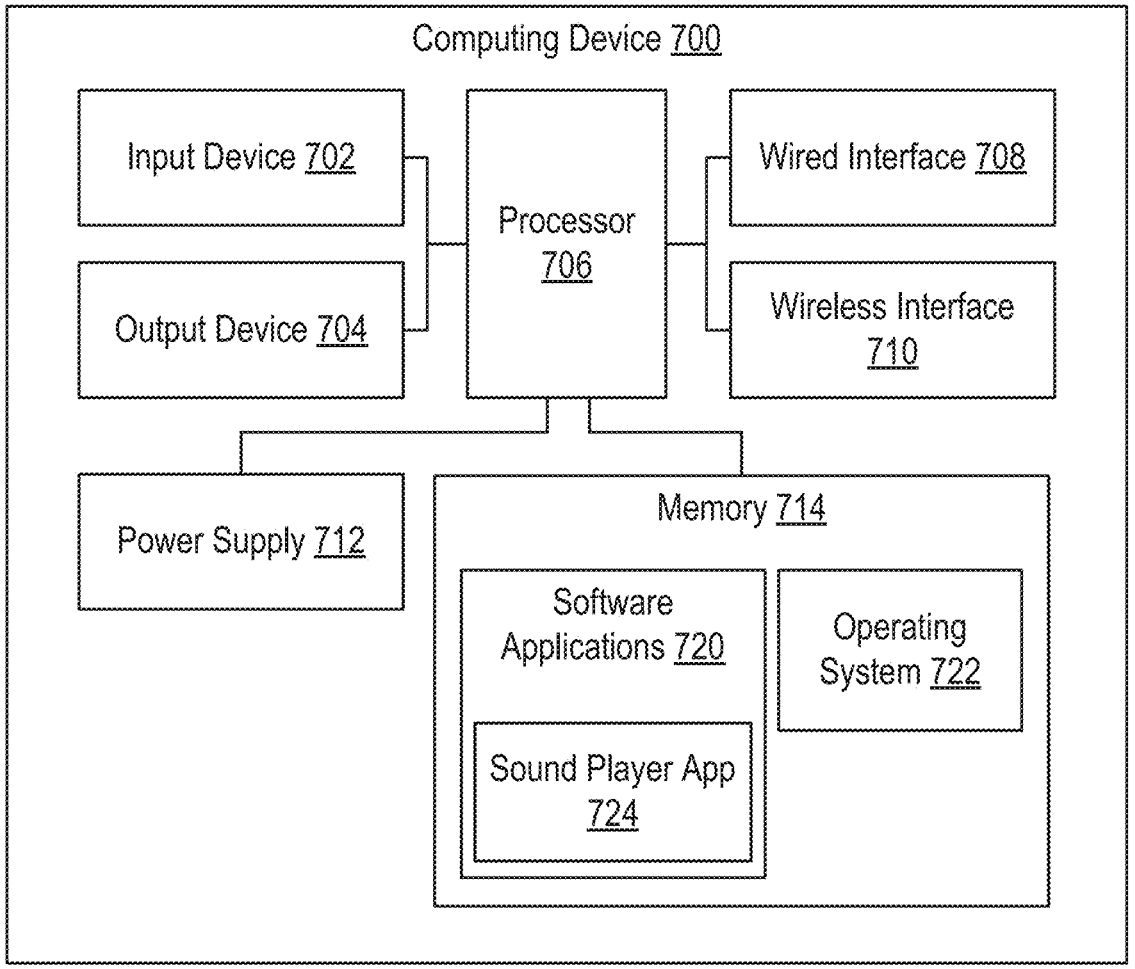
FIG. 15 illustrates a schematic diagram of an example embodiment of a computing device for modifying settings of the motion-activated sound player.

FIG. 15 illustrates a schematic diagram of an example embodiment of a computing device 700 for modifying settings of the motion-activated sound player. In an example, the computing device 700 is a mobile device, such as a smartphone. In other examples, the computing device 700 is a personal computer, such as a laptop. In some embodiments, the computing device 700 forms a wired connection with the motion-activated sound player. In alternative embodiments, the computing device forms a wireless connection, such as a Bluetooth connection, with the motion-activated sound player. In the illustrated embodiment, the computing device 700 includes an input device 702, an output device 704, a processor 706, a wired interface 708, a wireless interface 710, a power supply 712, and a memory 714.

The input device 702 operates to receive input from external sources. Such sources can include inputs received from a user. The inputs can be received through a touch-screen, a stylus, a keyboard, etc.

The output device 704 operates to provide output of information from the computing device 700. For example, a display can output visual information while a speaker can output audio information.

The processor 706 reads data and instructions. The data and instructions can be stored locally, received from an external source, or accessed from removable media.

The wired interface 708 allows for a wired connection with external devices, such as the motion-activated sound player. In an example, the wired interface 708 includes a USB-C port. In alternative embodiments, the wired interface 708 can include any type of port configured for a wired connection, including other USB ports.

The wireless interface 710 allows for wireless connections with external devices, such as the motion-activated sound player. In an embodiment, the wireless interface 710 includes a Bluetooth Low Energy (BLE) interface. In alternative embodiments, the wireless interface 710 can include an interface for other forms of wireless communication, including Wi-Fi, Zigbee, or Z-wave.

The power supply 712 provides power to the processor 706.

The memory 714 includes software applications 720 and an operating system 722. The memory 714 contains data and instructions that are usable by the processor to implement various functions of the computing device 700.

The software applications 720 can include applications usable to perform various functions on the computing device 700. One such application is a motion-activated sound player application 724. In a particular embodiment, when the motion-activated sound player application 724 is operating on the computing device 700, the motion-activated sound player application 724 can be configured to provide a user interface for modifying settings of a motion-activated sound player to which the computing device 700 is connected, either through the wired interface 708 or the wireless interface 710.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

19

20

What is claimed is:

1. A motion-activated sound player embeddable within a cavity of an outdoor memorial structure, comprising:
    a power source, the power source supplying power to the motion activated-sound player;
    a speaker;
    a motion sensor assembly; and
    a controller, the controller including:
        a temperature sensor; and
        a memory device, the memory device storing one or more audio tracks;
    wherein in response to the controller determining that a visitor is proximate to the motion-activated sound player based on signals from the motion sensor assembly and the temperature sensor determining that an operating temperature is within a predetermined operating temperature range, the controller sends a signal to the speaker to play at least a portion of a selected audio track of the stored one or more audio tracks.

2. The motion-activated sound player of claim 1, wherein the power source includes:
    a battery; and
    a solar panel assembly.

3. The motion-activated sound player of claim 1, wherein the predetermined operating temperature range is −20° C. to +50° C.

4. The motion-activated sound player of claim 1, wherein the one or more audio tracks are ordered in a playlist.

5. The motion-activated sound player of claim 4, wherein the selected audio track is selected based on a previously played audio track and an ordering of the playlist.

6. The motion-activated sound player of claim 1, wherein the controller further includes a programming port, wherein the programing port received signals from an external computing device to modify one or more settings of the motion-activated sound player.

7. The motion-activated sound player of claim 6, wherein the one or more settings of the motion-activated sound player include one or more of the predefined operating temperature range, a maximum playback time, motion sensor ranges, a list of audio tracks playable by the motion-activated sound player, a minimum charge level, a passerby timeframe, a post-playback wait period, and a timeout period length.

8. The motion-activated sound player of claim 1, further comprising:
    one or more temperature elements, wherein the one or more temperature elements maintain the operating temperature within the predetermined operating temperature range.

9. The motion-activated sound player of claim 8, wherein the temperature elements include one or more heating coils.

10. The motion-activated sound player of claim 9, wherein in response to the temperature sensor determining that the operating temperature is below the predetermined operating temperature range, the controller activates the heating coils to produce heat.

11. The motion-activated sound player of claim 1, further comprising:
    a capsule, including:
        a cavity divider defining a first cavity and a second cavity in the capsule;
    wherein the speaker is housed in the first cavity and the controller is housed in the second cavity.

12. The motion-activated sound player of claim 11, further comprising:
    a stone monument;
    wherein the capsule is installed in a bore in a side face of the stone monument;
    wherein the motion sensor assembly is installed on a front face of the stone monument; and
    wherein the power source is at least partially installed on a top face of the stone monument.

13. The motion-activated sound player of claim 12, further comprising:
    a heat sink, the heat sink contacting the stone monument and at least part of the power source to diffuse heat from the at least part of the power source to the stone monument.

14. The motion-activated sound player of claim 1, wherein the controller determines that the visitor is proximate to the motion-activated sound player based on signals from the motion sensor assembly if the controller receives, from the motion sensor assembly, a first signal indicating that the visitor entered a motion sensor range without receiving a second signal from the motion sensor assembly indicating that the visitor exited the motion sensor range within a predetermined passerby timeframe.

15. The motion-activated sound player of claim 1, wherein if the controller determines that a playback time has exceeded a maximum playback time, the controller transitions the motion-activated sound player to a timeout mode in which playback of audio tracks is disabled.

16. A motion-activated sound player, comprising:
    a capsule, including:
        a cavity divider defining a first cavity and a second cavity in the capsule;
        a face plate attachable to a front face of the capsule to enclose the first cavity; and
        an end cap attachable to the capsule to enclose the second cavity;
    wherein the first cavity houses:
        a speaker; and
    wherein the second cavity houses:
        a controller, including:
            a memory device, the memory device storing one or more audio tracks;
            a temperature sensor; and
            a battery, the battery supplying power to the motion activated-sound player;
    a motion sensor assembly; and
    a solar panel assembly, the solar panel assembly converting sunlight to electricity to selectively recharge the battery;
    wherein in response to the motion sensor assembly detecting motion and the temperature sensor determining that an operating temperature is within a predetermined operating temperature range, the controller sends a signal to the speaker to play at least a portion of a selected audio track of the stored one or more audio tracks.

17. The motion-activated sound player of claim 16, wherein if the temperature sensor determines that the operating temperature is not within the predetermined operating temperature range, the controller prevents recharging of the battery by the solar panel assembly.

18. The motion-activated sound player of claim 17, further comprising:

a stone monument;

wherein the capsule is installed in a bore in a side face of the stone monument;

wherein the motion sensor assembly is installed on a front face of the stone monument; and wherein the solar panel assembly is installed on a top face of the stone monument.

19. An audio-enabled stone monument, comprising:

a stone monument; and a motion-activated sound player, including:

a capsule installed in a bore on a side face of the stone monument, the capsule including:

a cavity divider defining a first cavity and a second cavity in the capsule;

wherein the first cavity houses:

a speaker; and wherein the second cavity houses:

a controller, including:

a memory device, the memory device storing one or more audio tracks;

a temperature sensor; and a battery, the battery supplying power to the motion activated-sound player;

a motion sensor assembly installed on a front face of the stone monument; and a solar panel assembly installed on a top face of the stone monument, the solar panel assembly converting sunlight to electricity to selectively recharge the battery;

wherein in response to the controller determining that a visitor is proximate to the stone monument based on signals from the motion sensor assembly and the temperature sensor determining that an operating temperature is within a predetermined operating temperature range, the controller sends a signal to the speaker to play at least a portion of a selected audio track of the stored one or more audio tracks.

20. The audio-enabled stone monument of claim 19, wherein the stone monument is a gravestone.

* * * * *